US008997452B2

(12) United States Patent
Hughes et al.

(10) Patent No.: US 8,997,452 B2
(45) Date of Patent: Apr. 7, 2015

(54) SYSTEMS AND METHODS FOR REGULATING FUEL AND REACTIVE FLUID SUPPLY IN TURBINE ENGINES

(75) Inventors: Michael John Hughes, Greer, SC (US); Bryan Wesley Romig, Simpsonville, SC (US); Abdul Rafey Khan, Greenville, SC (US)

(73) Assignee: General Electric Company, Schenectady, NY (US)

(*) Notice: Subject to any disclaimer, the term of this patent is extended or adjusted under 35 U.S.C. 154(b) by 597 days.

(21) Appl. No.: 13/277,352

(22) Filed: Oct. 20, 2011

(65) Prior Publication Data
US 2013/0098053 A1 Apr. 25, 2013

(51) Int. Cl.
F02C 9/00 (2006.01)
F23R 3/26 (2006.01)
F02C 9/26 (2006.01)
F02C 9/28 (2006.01)
F02C 9/34 (2006.01)
F02C 9/40 (2006.01)

(52) U.S. Cl.
CPC ... *F02C 9/26* (2013.01); *F02C 9/28* (2013.01); *F02C 9/34* (2013.01); *F02C 9/40* (2013.01)

(58) Field of Classification Search
CPC ............... F02C 9/26; F02C 9/28; F02C 9/34; F02C 9/40
USPC .......... 60/39.281, 39.27, 776, 773, 39.3, 775, 60/39.55
See application file for complete search history.

(56) References Cited

U.S. PATENT DOCUMENTS

| | | | | |
|---|---|---|---|---|
| 4,733,527 A * | 3/1988 | Kidd | | 60/775 |
| 4,928,478 A * | 5/1990 | Maslak | | 60/775 |
| 5,357,741 A * | 10/1994 | Talabisco et al. | | 60/775 |
| 5,373,692 A * | 12/1994 | Correa | | 60/776 |
| 5,442,922 A * | 8/1995 | Dyer et al. | | 60/739 |
| 6,121,628 A * | 9/2000 | Rising | | 250/573 |
| 6,321,526 B1 * | 11/2001 | Hamana | | 60/775 |
| 6,813,875 B2 * | 11/2004 | Inoue | | 60/39.281 |
| 6,874,323 B2 | 4/2005 | Stuttaford | | |
| 7,051,533 B2 * | 5/2006 | Baino et al. | | 60/773 |
| 7,565,805 B2 * | 7/2009 | Steber et al. | | 60/776 |
| 7,603,841 B2 | 10/2009 | Steele et al. | | |
| 7,640,725 B2 * | 1/2010 | Bland et al. | | 60/39.281 |
| 7,707,833 B1 | 5/2010 | Bland et al. | | |
| 7,874,157 B2 | 1/2011 | Evulet et al. | | |
| 7,966,801 B2 * | 6/2011 | Umeh et al. | | 60/39.281 |
| 8,707,671 B2 * | 4/2014 | Nakamura et al. | | 60/39.281 |
| 2003/0217554 A1 * | 11/2003 | Gadde et al. | | 60/776 |
| 2004/0035114 A1 * | 2/2004 | Hayashi et al. | | 60/737 |
| 2004/0194468 A1 * | 10/2004 | Ryan et al. | | 60/773 |
| 2006/0101814 A1 * | 5/2006 | Saitoh et al. | | 60/377 |

(Continued)

*Primary Examiner* — William H Rodriguez
(74) *Attorney, Agent, or Firm* — Armstrong Teasdale LLP

(57) ABSTRACT

A control system for use with a turbine engine that is configured to operate at a rated power output is provided. The control system includes a computing device that includes a processor that is programmed to calculate an amount of fluid to be supplied for combustion in the turbine engine. The processor is also programmed to designate at least one nozzle of a plurality of nozzles to receive the fluid. Moreover, the control system includes at least one control valve coupled to the computing device. The control valve is configured to receive at least one control parameter from the computing device for use in modulating the amount of the fluid to be channeled to the nozzle such that the rated power output is generated while emission levels are maintained below a predefined emissions threshold level.

17 Claims, 4 Drawing Sheets

(56) References Cited

U.S. PATENT DOCUMENTS

| | | |
|---|---|---|
| 2007/0113560 A1* | 5/2007 | Steber et al. .................. 60/773 |
| 2008/0115482 A1* | 5/2008 | LaGrow et al. ............ 60/39.281 |
| 2009/0234555 A1* | 9/2009 | Williams et al. .............. 701/100 |
| 2010/0162678 A1 | 7/2010 | Annigeri et al. |
| 2010/0170263 A1 | 7/2010 | Steele et al. |
| 2010/0175384 A1 | 7/2010 | Kraemer et al. |
| 2010/0300108 A1* | 12/2010 | Demougeot et al. ............ 60/773 |
| 2011/0270502 A1* | 11/2011 | Demougeot et al. .......... 701/100 |

* cited by examiner

SYSTEMS AND METHODS FOR REGULATING FUEL AND REACTIVE FLUID SUPPLY IN TURBINE ENGINES

BACKGROUND OF THE INVENTION

The field of the invention relates generally to turbine engines and, more particularly, to systems and methods for use in operating turbine engines.

At least some known turbine engines are used in cogeneration facilities and power plants. Some of such turbine engines may have high specific work and power per unit mass flow requirements. To increase the operating efficiency, at least some known turbine engines are operated with increased combustion temperatures, as engine efficiency generally increases as combustion gas temperatures increase.

However, operating with higher temperatures may also increase the generation of polluting emissions, such as carbon monoxide (CO) and oxides of nitrogen ($NO_x$). To reduce the generation of such emissions, at least some known turbine engines include combustion system designs and/or the use of other technology systems that are designed to reduce such emissions. For example, at least some turbine engines include a selective catalytic reduction (SCR) device on an exhaust system of the turbine engine. SCRs have been shown to reduce NOx emissions from Gas Turbine to approximately 2-3 ppm in the exhaust. However, SCR devices can be costly to install and to operate. Moreover, known SCR devices require expensive process chemicals, such as anhydrous ammonia, on a continuous basis to function. Because SCR devices also carry the environmental risk of ammonia emission as a by-product of their operation, many countries prohibit the use of ammonia-based SCR devices. In such countries, turbine operators must operate the turbine engines with firing temperatures that are below intended design ratings to achieve emissions compliance. Delivering approximately 2-3 ppm of NOx emissions from the gas turbine exhaust is difficult due to Lean Blow Out (LBO) concerns in the Gas Turbine Combustor using even the best available premixing technology.

Reduced levels of NOx emissions in turbine engines may also be achieved using known premixing technology, along with Dry Low NOx (DLN) combustion systems. For example, at least some known DLN combustion systems include multiple premix fuel circuits and/or fuel nozzles to reduce NOx emissions at a given cycle temperature. If the combustor can produce the target 2-3 ppm of NOx emissions at the desired cycle temperature, the machine can deliver the target output and performance. There is still, however, the issue of flame stability and LBO when running at such low NOx levels. Stability and LBO can be addressed with a process known as hydrogen doping. In a hydrogen doping process, hydrogen gas ($H_2$) is mixed with fuel prior to the fuel and hydrogen gas mixture being channeled to the fuel nozzles. Hydrogen doping has been shown to reduce emission levels and helps reduce a combustor lean blow out (LBO). However, the addition of hydrogen gas may actually increase $NO_x$ levels at a given cycle temperature. The effect is that in order to obtain a lower $NO_x$ level, the combustor exit temperature must be decreased. However, reducing the temperature within the combustor may result in decreasing the output of the turbine engine and/or decreasing the efficiency of the turbine engine. Moreover, hydrogen gas can be very expensive for use with all the fuel nozzles.

BRIEF DESCRIPTION OF THE INVENTION

In one embodiment, a control system for use with a turbine engine that is configured to operate at a rated power output is provided. The control system includes a computing device that includes a processor that is programmed to calculate an amount of fluid to be supplied for combustion in the turbine engine. The processor is also programmed to designate at least one nozzle of a plurality of nozzles to receive the fluid. Moreover, the control system includes at least one control valve coupled to the computing device. The control valve is configured to receive at least one control parameter from the computing device for use in modulating the amount of the fluid to be channeled to the nozzle such that the rated power output is generated while emission levels are maintained below a predefined emissions threshold level.

In another embodiment, a turbine engine that is configured to operate at a rated power output is provided. The turbine engine includes at least one compressor and a combustor section that is coupled downstream from the compressor. The combustor section includes at least one combustor. Moreover, the turbine engine includes a control system that is coupled to the combustor. The control system includes a computing device that includes a processor that is programmed to calculate an amount of fluid to be supplied for combustion in the turbine engine. The processor is also programmed to designate at least one nozzle of a plurality of nozzles to receive the fluid. Moreover, the control system includes at least one control valve coupled to the computing device. The control valve is configured to receive at least one control parameter from the computing device for use in modulating the amount of the fluid to be channeled to the nozzle such that the rated power output is generated while emission levels are maintained below a predefined emissions threshold level.

In yet another embodiment, a method for use in operating a turbine engine that is configured to operate at a rated power output is provided. An amount of fluid to be supplied for combustion in the turbine engine is calculated. At least one nozzle of a plurality of nozzles is designated, via a computing device, to receive the fluid. At least one control parameter is transmitted to at least one control valve. Moreover, the fluid is channeled to the nozzle such that the rated power output is generated while emission levels are maintained below a predefined emissions threshold level.

DETAILED DESCRIPTION OF THE INVENTION

The exemplary systems and methods described herein overcome at least some known disadvantages associated with at least some known turbine engines by providing a combustion system that operates within a turbine engine with hydrogen gas in an efficient and cost effective manner to generate power. More specifically, the embodiments described herein provide a control system for use with a turbine engine that is configured to operate at a rated power output. The control system includes a computing device that includes a processor that is programmed to calculate an amount of a fluid, such as a reactive fuel or a reactive gas, including hydrogen gas, to be supplied for combustion in the turbine engine. The processor is also programmed to designate at least one nozzle of a plurality of nozzles to receive the fluid. Moreover, the control system includes at least one control valve coupled to the computing device. The control valve is configured to receive at least one control parameter from the computing device for use in modulating the amount of the fluid to be channeled to the nozzle such that the rated power output is generated while emission levels are maintained below a predefined emissions threshold level. By channeling the fluid, such as a reactive fuel or a reactive gas, including hydrogen gas, to only one nozzle, as opposed to all the nozzles within the combustor, a stability and LBO benefit is achieved without incurring a significant NOx penalty, allowing the machine to continue to run a target combustor exit temperature. As such, the turbine engine is able to generate power at an increased efficiency rate, while maintaining emission levels below a predefined emissions threshold level (approximately 2-3 ppm). Moreover, because less fluid, such as hydrogen gas, is being used, the embodiments described herein provide a more cost effective approach to generate power with low single digit NOx emissions.

Figure 1:
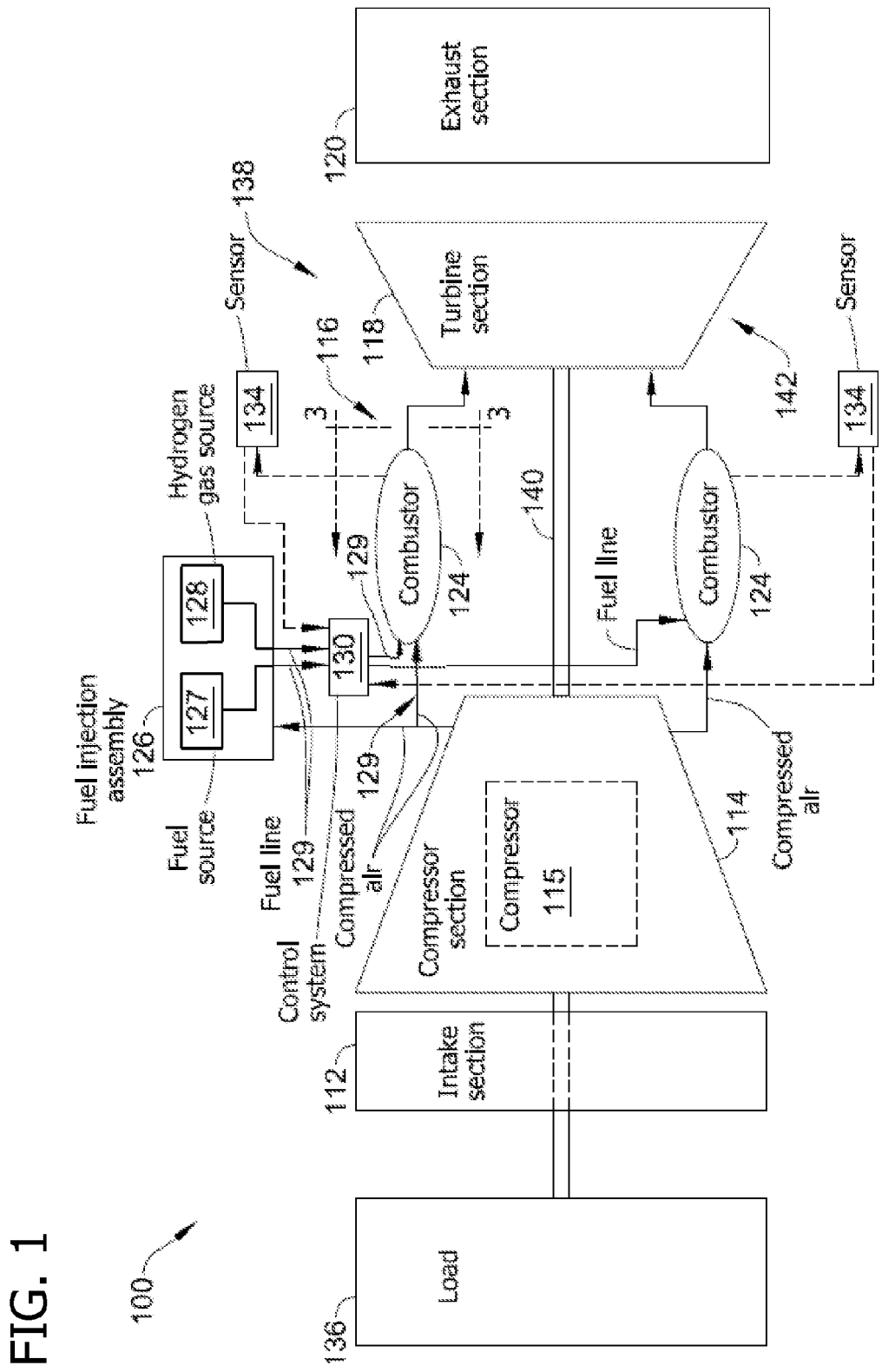
FIG. 1 is a block diagram of an exemplary turbine engine.

FIG. 1 illustrates an exemplary turbine engine 100 that is configured to operate at a rated power output. More specifically, turbine engine 100 is a gas turbine engine. While the exemplary embodiment includes a gas turbine engine, the present invention is not limited to any one particular engine, and one of ordinary skill in the art will appreciate that the current invention may be used in connection with other types of turbine engines. In the exemplary embodiment, turbine engine 100 includes an intake section 112, a compressor section 114 coupled downstream from intake section 112, a combustor section 116 coupled downstream from compressor section 114, a turbine section 118 coupled downstream from combustor section 116, and an exhaust section 120. Turbine section 118 is coupled to compressor section 114 via a rotor shaft 140. In the exemplary embodiment, compressor section 114 includes a compressor 115. It should be noted that, as used herein, the term "couple" is not limited to a direct mechanical, electrical, and/or communication connection between components, but may also include an indirect mechanical, electrical, and/or communication connection between multiple components.

Moreover, in the exemplary embodiment, combustor section 116 includes at least one combustor 124. More specifically, in the exemplary embodiment, turbine engine 100 includes two combustors 124. Alternatively, turbine engine 100 may include any number of combustors 124 that enables turbine engine 100 to function as described herein. In the exemplary embodiment, combustor section 116 is coupled to compressor section 114 such that each combustor 124 is positioned in flow communication with compressor 115. A fuel injection assembly 126 is coupled to each combustor 124. In the exemplary embodiment, fuel injection assembly 126 includes a fuel source 127 and a hydrogen gas source 128 that are coupled to each combustor 124 via at least one fluid line 129. A control system 130 is coupled to fuel source 127 and hydrogen gas source 128. In the exemplary embodiment, control system 130 regulates a flow of hydrogen gas and fuel to each combustor 124.

Turbine engine 100 also includes at least one sensor 134 that are each coupled to a respective combustor 124. Each sensor 134 detects at least one operational parameter of each combustor 124, such as an operating temperature and/or pressure. Moreover, in the exemplary embodiment, each sensor 134 is coupled to control system 130 such that control system 130 receives at least one signal representative of the operating parameters detected and transmitted by each sensor 134.

Moreover, in the exemplary embodiment, turbine section 118 is coupled to compressor section 114 and to a load 136 such as, but not limited to, an electrical generator and/or a mechanical drive application. In the exemplary embodiment, each compressor section 114 and turbine section 118 includes at least one rotor disk assembly 138 that is coupled to rotor shaft 140 to form a rotor assembly 142.

During operation, intake section 112 channels air towards compressor section 114 wherein the air is compressed to a higher pressure and temperature prior to being discharged towards combustor section 116. The compressed air is mixed with fuel and ignited to generate combustion gases that are channeled towards turbine section 118. More specifically, in combustors 124, fuel, for example, natural gas and/or fuel oil, is injected into the air flow, and the fuel-air mixture is ignited to generate high temperature combustion gases that are channeled towards turbine section 118.

At the same time, hydrogen gas is injected and channeled into each combustor 124. While hydrogen gas is being injected and channeled into each combustor in the exemplary embodiment, any other type of a reactive fluid, such as a reactive fuel or any other type of reactive gas may be used in place of or in addition to the hydrogen gas.

In the exemplary embodiment, after receiving operational parameters associated with each combustor 124 from their respective sensors 134, control system 130 calculates a threshold level for an amount of hydrogen gas to be injected into combustor section 116. In the exemplary embodiment, control system 130 calculates the threshold level for an amount of hydrogen gas by using, for example, any suitable algorithm known to one of ordinary skill in the art. Moreover, in the exemplary embodiment, control system 130 designates at least one nozzle (not shown in FIG. 1) of a plurality of nozzles (not shown) within each combustor 124 to receive the hydrogen gas, wherein each of the nozzles are substantially aligned within a cap member (not shown in FIG. 1). In one embodiment, the designated nozzle may be a center nozzle (not shown in FIG. 1) of each combustor 124, wherein the center nozzle is aligned substantially concentrically within the cap member such that the other nozzles, such as outer nozzles (not shown in FIG. 1) are spaced radially outward from and adjacent to the center nozzle.

Control system 130 regulates a flow of hydrogen gas, via fluid line 129, into the center nozzle, and prevents other nozzles, such as the outer nozzles, within each combustor 124 from receiving the hydrogen gas. More specifically, in the exemplary embodiment, control system 130 regulates the flow of hydrogen gas to each combustor 124 to ensure that the amount of hydrogen gas supplied to each combustor 124 does not exceed a predefined threshold level. In the exemplary embodiment, hydrogen gas that is channeled into the center nozzle is discharged from the center nozzle and dispersed between the center nozzle and at least one adjacent outer nozzle, and is thus ignited with the fuel-air mixture to facilitate increased stability and LBO margin within each combustor 124 and/or turbine engine 100.

Turbine section 118 converts the thermal energy from the gas stream to mechanical rotational energy, as the combustion gases impart rotational energy to turbine section 118 and to rotor assembly 142. Further, as a result of the hydrogen gas being injected into the center nozzle of each combustor 124, as opposed to the outer nozzles within each combustor 124, a lower $NO_x$ penalty is incurred such that the combustor exit temperature does not have to be decreased. As such, turbine engine 100 is able to generate the rated power output, while emission levels are maintained below a predefined emissions threshold level. Moreover, because only one nozzle within each combustor 124 receives the hydrogen gas, less hydrogen gas is needed. Accordingly, turbine engine 100 operates in a more cost effective approach to generating power.

Figure 2:
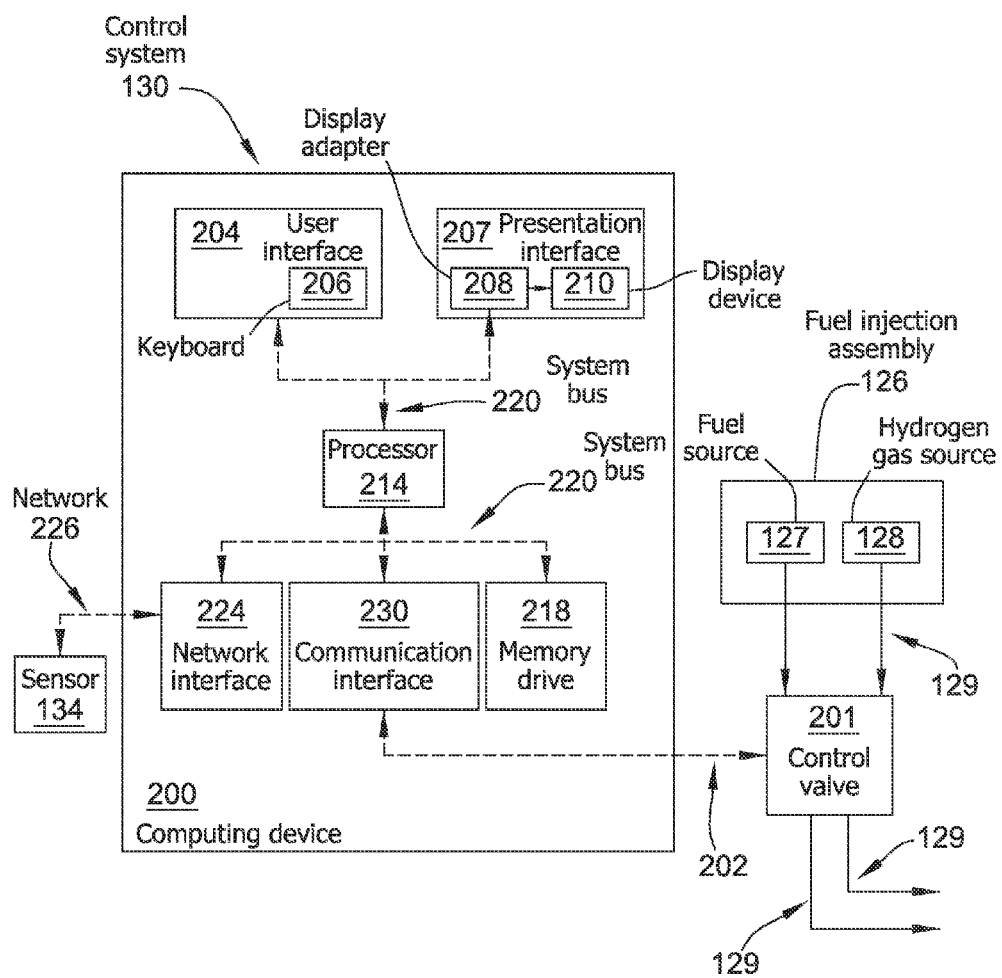
FIG. 2 is a block diagram of an exemplary control system that may be used with the turbine engine shown in FIG. 1.

FIG. 2 illustrates a block diagram of control system 130, which includes an exemplary computing device 200 and at least one control valve 201 that is coupled to computing device 200 via a conduit 202. Alternatively, computing device 200 and control valve 201 may be wirelessly coupled to each other. In the exemplary embodiment, control valve 201 is coupled to fuel source 127 and hydrogen gas source 128 via fluid lines 129. Control valve 201 is also coupled to each combustor 124 (shown in FIG. 1) via fluid lines 129. In the exemplary embodiment, computing device 200 modulates control valve 201 to regulate the hydrogen gas and fuel being channeled into each combustor 124.

In the exemplary embodiment, computing device 200 includes a user interface 204 that receives at least one input from a user. In the exemplary embodiment, user interface 204 includes a keyboard 206 that enables a user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 200 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 200 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218. More specifically, processor 214 is programmed to calculate a threshold level for an amount of hydrogen gas for use in combustor 124 and processor 214 is programmed to designate at least one nozzle (not shown in FIG. 2) within each combustor 124 for receiving the hydrogen gas. In the exemplary embodiment, processor 214 calculates the threshold level for an amount of hydrogen gas by using, for example, any suitable algorithm known to one of ordinary skill in the art.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by the user via user interface 204 and/or information received from other components of control system 130 and/or turbine engine 100.

Computing device 200 also includes a network interface 224 that couples to a network 226 to facilitate communication with each sensor 134 (shown in FIG. 1). In the exemplary embodiment, network 226 may include, but is not limited to only including, the Internet, a local area network (LAN), a wide area network (WAN), a wireless LAN (WLAN), a mesh network, and/or a virtual private network (VPN). Moreover, in the exemplary embodiment, computing device 200 is coupled to each sensor 134 via network 226. In the exemplary embodiment, each sensor 134 communicates with computing device 200 using a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y. Alternatively, each sensor 134 may communicate with computing device 200 using a wired network connection (e.g., Ethernet or an optical fiber).

Moreover, in the exemplary embodiment, computing device 200 includes a communication interface 230 that is coupled to processor 214 via system bus 220. Moreover, in the exemplary embodiment, communication interface 230 is coupled to control valve 201 via conduit 202. In the exemplary embodiment, communication interface 230 communicates with control valve 201 and/or other components of turbine engine 100.

During operation, each sensor 134 detects various operational parameters from a respective combustor 124. More specifically, in the exemplary embodiment, each sensor 134 detects the operating temperature and/or pressure within their respective combustor 124. Each sensor 134 transmits at least one signal representative of the detected operational parameters to computing device 200 via network 226. More specifically, in the exemplary embodiment, network interface 224 receives each signal and transmits each signal to processor 214 and to memory device 218. Processor 214 calculates a threshold level for an amount of hydrogen to be supplied to each combustor 124 based on the operational parameters received from sensor 134. Moreover, processor 214 designates at least one nozzle within each combustor 124 to receive the hydrogen gas. More specifically, in the exemplary embodiment, processor 214 designates at least one center nozzle (not shown in FIG. 2) in each combustor 124 to receive the hydrogen gas. Alternatively, a user may input a designation for the nozzle in each combustor 124 that is to receive the hydrogen gas via user interface 204.

Processor 214 transmits a signal representative of a control parameter to control valve 201 via communication interface 230. In response to the signal received, each control valve 201 is modulated to an open position to enable hydrogen gas to be channeled to at least the center nozzle of each combustor 124. Moreover, in one embodiment, hydrogen gas is not channeled to any other nozzles (not shown in FIG. 2) within each combustor 124. Each sensor 134 also detects an amount of hydrogen gas channeled to each center nozzle and transmits an associated signal to computing device 200. Processor 214 receives the signal and transmits a signal, via communication interface 230, to control valve 201 to ensure an amount of hydrogen gas supplied to each combustor 124 does not exceed the pre-defined threshold. More specifically, in the exemplary embodiment, as the threshold level is reached, control valve 201 is modulated to a closed position to prevent the hydrogen gas from entering combustor 124.

Figure 3:
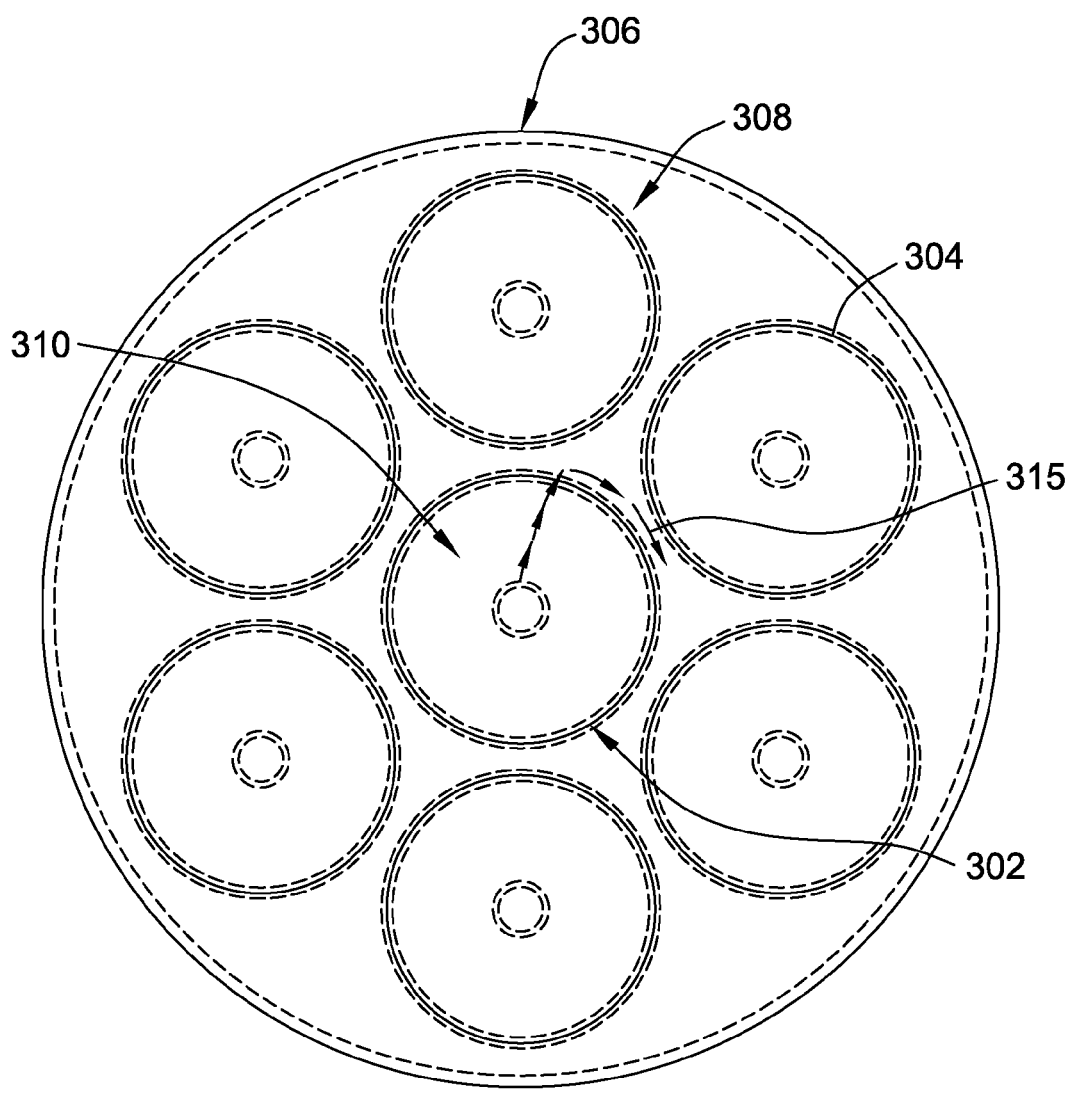
FIG. 3 is a schematic cross-sectional view of a portion of a combustor used with the turbine engine shown in FIG. 1 and taken along line 3-3 (shown in FIG. 1)

FIG. 3 illustrates a schematic cross-sectional view of a portion of an exemplary combustor 124 taken along line 3-3 (shown in FIG. 1). In the exemplary embodiment, combustor 124 includes at least one center nozzle 302 and a plurality of outer nozzles 304 that are adjacent to center nozzle 302. Moreover, outer nozzles 304 and center nozzle 302 are coupled within a cap member 306. More specifically, in the exemplary embodiment, center nozzle 302 and outer nozzles 304 are coupled within a downstream portion 308 of cap member 306. Alternatively, center nozzle 302 and outer nozzle 304 may be formed integrally within cap member 306.

In the exemplary embodiment, center nozzle 302 is substantially concentrically aligned within cap member 306 and each outer nozzle 304 is spaced radially outward from center nozzle 302. Alternatively, each outer nozzle 304 may be spaced axially outward from center nozzle 302. More specifically, outer nozzles 304 are spaced circumferentially about center nozzle 302 within downstream portion 308 of cap member 306. Alternatively, outer nozzles 304 and center nozzle 302 may be arranged in any orientation that enables turbine engine 100 to function as described herein. Moreover, in the exemplary embodiment, outer nozzles 304 and center nozzle 302 each include an inlet 310 that is coupled to line 129 (shown in FIG. 1) for receiving hydrogen gas.

During operation, processor 214 (shown in FIG. 2) transmits a signal to control valve 201 (shown in FIG. 2) via communication interface 230 (shown in FIG. 2). In response, control valve 201 enables hydrogen gas to be channeled into center nozzle 302. More specifically, in the exemplary embodiment, as control valve 201 is modulated to an open position, hydrogen gas is channeled to center nozzle 302 via fluid line 129. Moreover, in the exemplary embodiment, in at least some operational modes, hydrogen gas is not channeled to any other nozzles, such as outer nozzles 304. Further, in the exemplary embodiment, hydrogen gas is channeled into center nozzle inlet 310. The hydrogen gas is discharged from center nozzle 302 and is dispersed between center nozzle 302 and at least one outer nozzle 304, as shown by arrows 315.

Sensor 134 (shown in FIG. 1) detects when the hydrogen gas channeled to center nozzle 302 reaches a threshold level and transmits a signal to computing device 200 (shown in FIGS. 1 and 2). Processor 214 receives the signal and then transmits a signal, via communication interface 230, to control valve 201 to prevent additional hydrogen gas from being channeled to center nozzle 302 at that time. More specifically, in the exemplary embodiment, control valve 201 is modulated to a closed position to prevent hydrogen gas from entering center nozzle 302.

Further, as a result of the hydrogen gas being injected into center nozzle 302, a stability and LBO benefit is obtained without incurring a significant NOx penalty, allowing the machine to continue to run a target combustor exit temperature. As such, turbine engine 100 (shown in FIG. 1) is able to generate the rated power output, while emission levels are maintained below a predefined emissions threshold level. Moreover, because only center nozzle 302 receives the hydrogen gas, less hydrogen gas is needed. Accordingly, turbine engine 100 operates in a more cost effective approach to generating power.

Figure 4:
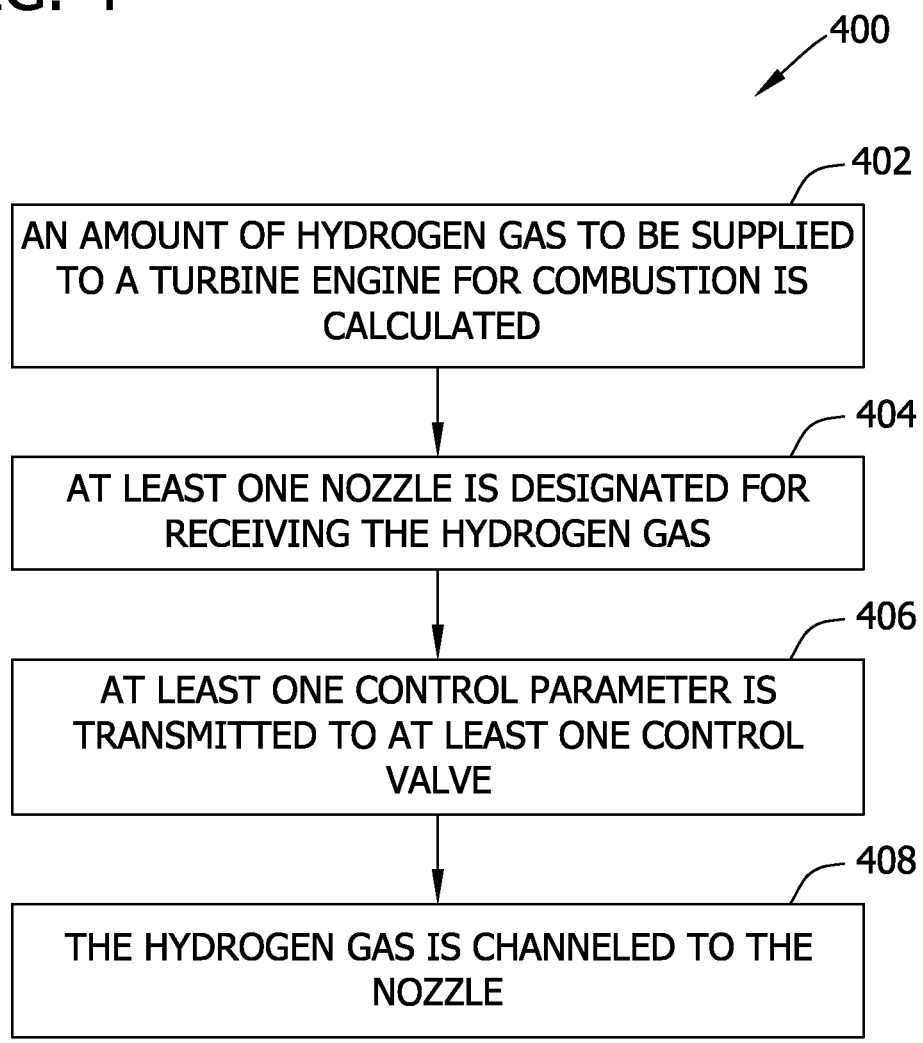
FIG. 4 is a flow chart of an exemplary method that may be used for operating the turbine engine shown in FIG. 1.

FIG. 4 is a flow chart of an exemplary method 400 that may be used to operate a turbine engine, such as turbine engine 100 (shown in FIG. 1), by using a control system, such as control system 130 (shown in FIGS. 1 and 2). An amount of a fluid, such as hydrogen gas to be supplied to turbine engine 100 for combustion is calculated 402. At least one nozzle, such as a center nozzle 302 (shown in FIG. 3), of a plurality of nozzles, such as outer nozzles 304 (shown in FIG. 3), is designated 404, via a computing device 200 (shown in FIG. 2), for receiving the hydrogen gas.

Moreover, in the exemplary embodiment, at least one control parameter is transmitted 406 to at least one control valve 201 (shown in FIG. 2). The hydrogen gas is then channeled 408 to center nozzle 302 such that the rated power output is generated while emission levels are maintained below a predefined emissions threshold level.

As compared to known turbine engines, the above-described embodiments provide a combustion system that operates within a turbine engine with hydrogen gas in an efficient and cost effective manner to generate power. More specifically, the embodiments described herein provide a control system for use with a turbine engine that is configured to operate at a rated power output. The control system includes a computing device that includes a processor that is programmed to calculate an amount of a fluid, such as a reactive fuel or a reactive gas, including hydrogen gas, to be supplied for combustion in the turbine engine. The processor is also programmed to designate at least one nozzle of a plurality of nozzles to receive the fluid. Moreover, the control system includes at least one control valve coupled to the computing device. The control valve is configured to receive at least one control parameter from the computing device for use in modulating the amount of the fluid to be channeled to the nozzle such that the rated power output is generated while emission levels are maintained below a predefined emissions threshold level. By channeling the fluid, such as a reactive fuel or a reactive gas, including hydrogen gas, to only one nozzle, as opposed to all the nozzles within the combustor, a lower $NO_x$ level is achieved without reducing the combustor exit temperature. As such, the turbine engine is able to generate power at an increased efficiency rate, while maintaining emission levels below a predefined emissions threshold level. Moreover, because less fluid, such as hydrogen gas, is being used, the embodiments described herein provide a more cost effective approach to generate power.

Exemplary embodiments of systems and methods for use in operating turbine engines are described above in detail. The systems and methods are not limited to the specific embodiments described herein, but rather, components of each system and/or steps of each method may be utilized independently and separately from other components and/or steps described herein. For example, each system may also be used in combination with other systems and methods, and is not limited to practice with only systems as described herein. Rather, the exemplary embodiment can be implemented and utilized in connection with many other applications.

A technical effect of the systems and methods described herein includes at least one of: (a) calculating an amount of fluid to be supplied for combustion in a turbine engine; (b) designating, via a computing device, at least one nozzle of a plurality of nozzles to receive fluid; (c) transmitting at least one control parameter to at least one control valve; and (d) channeling fluid to at least one nozzle such that the rated power output is generated while emission levels are maintained below a predefined emissions threshold level.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for use with a turbine engine that is configured to operate at a rated power output, said control system comprising:
    a sensor coupled to a combustor of the turbine engine, said sensor configured to detect at least one operating parameter of the combustor and to transmit the at least one operating parameter associated with the combustor to a computing device;
    a computing device configured to receive the at least one operating parameter from said sensor, said computing device comprising a processor programmed to calculate an amount of a fluid to be supplied to the combustor of the turbine engine based on the at least one operating parameter, said processor further programmed to designate at least one nozzle of a plurality of nozzles of the combustor to receive the fluid, wherein the at least one nozzle comprises fewer than all of the plurality of nozzles; and
    at least one control valve coupled to said computing device, said computing device modulates said at least one control valve to regulate the fluid to said at least one nozzle and a fuel channeled into the combustor via any of said plurality of nozzles, wherein the fluid is discrete from the fuel, said at least one control valve is configured to receive at least one control parameter from said computing device for use in regulating the fluid to be channeled to the at least one nozzle such that the rated power output is generated while emission levels are maintained below a predefined emissions threshold level.

2. A control system in accordance with claim 1, wherein said computing device further comprises a communication interface coupled to said processor, said communication interface is configured to transmit the at least one control parameter to said at least one control valve.

3. A control system in accordance with claim 1, wherein said computing device modulates said at least one control valve to regulate the fluid that is at least one of a reactive fuel and a reactive gas.

4. A control system in accordance with claim 1, wherein said computing device modulates said at least one control valve to regulate the fluid that is hydrogen gas.

5. A control system in accordance with claim 1, wherein said at least one control valve controls a flow of the fluid to the at least one nozzle such that the nozzle discharges the fluid to be substantially dispersed between the at least one nozzle and at least one adjacent nozzle that is spaced outwardly from the at least one nozzle.

6. A control system in accordance with claim 1, wherein said computing device further comprises a user interface coupled to said processor, said user interface enables a user to selectively designate the at least one nozzle to receive the fluid.

7. A turbine engine configured to operate at a rated power output, said turbine engine comprising:
    a compressor;
    a combustor section coupled downstream from said compressor, wherein said combustor section comprises at least one combustor, each said at least one combustor comprises a plurality of nozzles;
    a control system coupled to said at least one combustor, said control system comprising:
        a sensor coupled to each said at least one combustor, said sensor configured to detect at least one operating parameter of each said at least one combustor and to transmit the at least one operating parameter associated with each said at least one combustor to a computing device;
        a computing device configured to receive the at least one operating parameter from said sensor, said computing device comprising a processor programmed to calculate an amount of fluid to be supplied to each said at least one combustor based on the at least one operating parameter, said processor further programmed to designate at least one nozzle of said plurality of nozzles of each said at least one combustor to receive the fluid, wherein said at least one nozzle comprises fewer than all of said plurality of nozzles of each said at least one combustor; and
        at least one control valve coupled to said computing device, said computing device modulates said at least one control valve to regulate the fluid to said at least one nozzle and a fuel channeled into said at least one combustor via any of said plurality of nozzles, wherein the fluid is discrete from the fuel, said at least one control valve is configured to receive at least one control parameter from said computing device for use in regulating the fluid to be channeled to said at least one nozzle such that the rated power output is generated while emission levels are maintained below a predefined emissions threshold level.

8. A turbine engine in accordance with claim 7, wherein said computing device further comprises a communication interface coupled to said processor, said communication interface is configured to transmit the at least one control parameter to said at least one control valve.

9. A turbine engine in accordance with claim 7, wherein said computing device modulates said at least one control valve to regulate the fluid that is at least one of a reactive fuel and a reactive gas.

10. A turbine engine in accordance with claim 7, wherein said computing device modulates said at least one control valve to regulate the fluid that is hydrogen gas.

11. A turbine engine in accordance with claim 7, wherein said at least one control valve controls a flow of the fluid to said at least one nozzle such that said nozzle discharges the fluid to be substantially dispersed between said at least one nozzle and at least one adjacent nozzle that is spaced outwardly from said at least one nozzle.

12. A turbine engine in accordance with claim 7, wherein said computing device further comprises a user interface coupled to said processor, said user interface enables a user to selectively designate the at least one nozzle to receive the fluid.

13. A method for use in operating a turbine engine configured to operate at a rated power output, said method comprising:

calculating an amount of fluid to be supplied to a combustor of the turbine engine based on at least one operating parameter detected by a sensor coupled to the combustor;

designating, via a computing device, at least one nozzle of a plurality of nozzles of the combustor to receive the fluid, wherein the at least one nozzle comprises fewer than all of the plurality of nozzles;

modulating at least one control valve to regulate the fluid to the at least one nozzle and a fuel channeled into the combustor via any of the plurality of nozzles, wherein the fluid is discrete from the fuel;

transmitting at least one control parameter to the at least one control valve; and channeling the fluid to the at least one nozzle based at least in part on the at least one control parameter such that the rated power output is generated while emission levels are maintained below a predefined emissions threshold level.

14. A method in accordance with claim 13, wherein calculating the amount of fluid further comprises calculating an amount of at least one of a reactive fuel and a reactive gas.

15. A method in accordance with claim 13, wherein calculating the amount of fluid further comprises calculating an amount of hydrogen gas.

16. A method in accordance with claim 13, wherein channeling the fluid to the at least one nozzle further comprises channeling the fluid to the at least one nozzle that is configured to discharge the fluid such that the fluid is substantially dispersed between the at least one nozzle and at least one adjacent nozzle that is spaced outwardly from the at least one nozzle.

17. A method in accordance with claim 13, wherein transmitting the at least one control parameter to the at least one control valve further comprises transmitting, via a communication interface, the at least one control parameter to the at least one control valve.

* * * * *